(12) United States Patent
Pahlavan et al.

(10) Patent No.: US 8,005,486 B2
(45) Date of Patent: Aug. 23, 2011

(54) PRECISE NODE LOCALIZATION IN SENSOR AD-HOC NETWORKS

(75) Inventors: Kaveh Pahlavan, Newton, MA (US); Nayef Al-Sindi, Malden, MA (US); Bardia Alavi, Shaker Heights, OH (US)

(73) Assignee: Worcester Polytechnic Institute, Worcester, MA (US)

( * ) Notice: Subject to any disclaimer, the term of this patent is extended or adjusted under 35 U.S.C. 154(b) by 766 days.

(21) Appl. No.: 12/009,836

(22) Filed: Jan. 22, 2008

(65) Prior Publication Data

US 2008/0232281 A1    Sep. 25, 2008

Related U.S. Application Data

(60) Provisional application No. 60/881,751, filed on Jan. 22, 2007.

(51) Int. Cl.
*H04W 24/00* (2009.01)
(52) U.S. Cl. .................. 455/456.1; 455/404.2; 342/126; 342/450
(58) Field of Classification Search ............... 455/456.1, 455/404.2; 342/126, 450
See application file for complete search history.

(56) References Cited

U.S. PATENT DOCUMENTS

| | | | |
|---|---|---|---|
| 6,983,146 B2 | 1/2006 | Spratt | |
| 2004/0198386 A1 * | 10/2004 | Dupray | 455/456.1 |
| 2005/0080924 A1 | 4/2005 | Shang et al. | |
| 2005/0288888 A1 | 12/2005 | Ye et al. | |

OTHER PUBLICATIONS

Savvides et al. Dynamic Fine-Grained Localization in Ad-Hoc Networks of Sensors. ACM Sigmobile. pp. 166-179 (2001).
Niculescu et al. Ad Hoc Positioning System (APS). IEEE GLOBECOM (Nov. 2001).
Ji et al. Sensor Positioning in Wireless Ad-hoc Sensor Networks Using Multidimensional Scaling. IEEE INFOCOM 2004.
Shang et al. Localization from connectivity in sensor networks. IEEE Trans. on Parallel and Distributed Systems. 15:11, 961-74 (2004).
Savarese et al. Locationing in distributed ad-hoc wireless sensor networks. IEEE ICASSP May 2001.

* cited by examiner

*Primary Examiner* — Nghi H Ly
(74) *Attorney, Agent, or Firm* — Ropes & Gray LLP

(57) ABSTRACT

Methods and systems for configuring ad-hoc networks, especially a self-configuring wireless sensor networks, are described. The network has an initial number of anchors with known positions that broadcast a signal. The signals are received by distributed nodes whose position is not yet known. The nodes rank the received signal based on a Quality of Link (QoL; received signal strength) and compute a Quality of position Estimate (QoE) for the node. The node with the best QoE is elevated to anchor. This process gradually increases the number of available anchors in the network and hence the position accuracy for additional nodes. The system can be used for geolocation of soldiers in the indoor combat, tracking the location of firefighter and other emergency personnel in rescue missions, etc.

7 Claims, 6 Drawing Sheets

PRECISE NODE LOCALIZATION IN SENSOR AD-HOC NETWORKS

CROSS-REFERENCE TO RELATED APPLICATION

This application claims the benefit of U.S. Provisional Application Ser. No. 60/881,751, filed Jan. 22, 2007, the entire contents of which are incorporated herein by reference.

GOVERNMENT CONTRACT

The U.S. Government has a paid-up license in this invention and the right in limited circumstances to require the patent owner to license others on reasonable terms as provided for by the terms of Defense Advanced Research Projects Agency Contract No. W911 QX-05-C-0008.

BACKGROUND OF THE INVENTION

This invention relates to ad-hoc networks, especially to a self-configuring wireless sensor network operating in multipath-rich indoor areas, and to a method for organizing such network.

There has been an increase in the use of ad-hoc wireless sensor networks for monitoring environmental information (temperature, pressure, mineral content, sound levels, light etc) across an entire physical space. The sensor data from these sensors may only be useful if the location they refer to is known with sufficient precision. Position data can be obtained from Global Positioning System (GPS) data which, however, is a very expensive solution to this requirement. Instead, techniques to estimate sensor/node positions are being developed that rely just on the measurements of distances between neighboring nodes. The distance information could be based on such criteria as time of arrival, time-difference of arrival and received signal strength. Depending on the accuracy of these measurements, processor power and memory constraints at each of the nodes, there is some degree of error in the distance information.

The precision with which the location of a sensor can be determined tends to increase with the number of nodes near the sensor that have a known position. In many situations, however, only the positions of a few anchor nodes are known which were previously determined using, for example, GPS data. Position determination required to locate, for example, emergency response personnel inside a building needs to be quite accurate in order to provide assistance in the event of impending danger.

It would therefore be desirable to add, preferably automatically, additional trusted nodes, i.e., nodes whose location is known, to an ad-hoc network, which can then be used to allow a more accurate position determination of sensors.

SUMMARY OF THE INVENTION

The invention uses behavior of the distance measurement errors to define Quality of Link (QoL) and Quality of Estimate (QoE) values based on which the Cooperative Localization with Optimum Quality of Estimate (CLOQ) algorithm can provide accurate indoor geolocation.

CLOQ is an iterative algorithm for accurate cooperative localization for sensor and ad-hoc networks based on the measured radio channel behavior in multipath-rich indoor areas. A subset of the deployed nodes, called anchors, know their exact position a priori (e.g. using GPS). In the first iteration, all nodes with adequate coverage from anchor nodes ($\geq 3$ nodes for 2D localization and $\geq 4$ nodes for 3D localization) calculate their location and their Quality of Estimate (QoE). The QoE of a node is calculated based on the Quality of Link (QoL) class of the individual links used for localization of the node. The QoL class is determined from a table constructed from empirical radio channel propagation data which categorize the QoL in three classes based on the received signal strength. Once nodes compute their QoE they enter into a transition state called anchor nominee where they compete with neighboring nominees. The nodes with the highest QoE upgrade their status from anchor nominee to anchor and start broadcasting their own location. The next iteration defines new nominees and a new set of anchor nodes. The iteration continues until optimally all nodes in the coverage area find their optimal location estimate and become anchors. Results of simulation based on measured empirical data suggest that the algorithm is suitable for accurate indoor geolocation.

The systems and methods of the invention can be applied to, for example, indoor geolocation of soldiers in the indoor combat, tracking the location of firefighter and other emergency personnel in rescue missions, etc.

Further features and advantages of the present invention will be apparent from the following description of exemplary embodiments and from the claims.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

Figure 1:
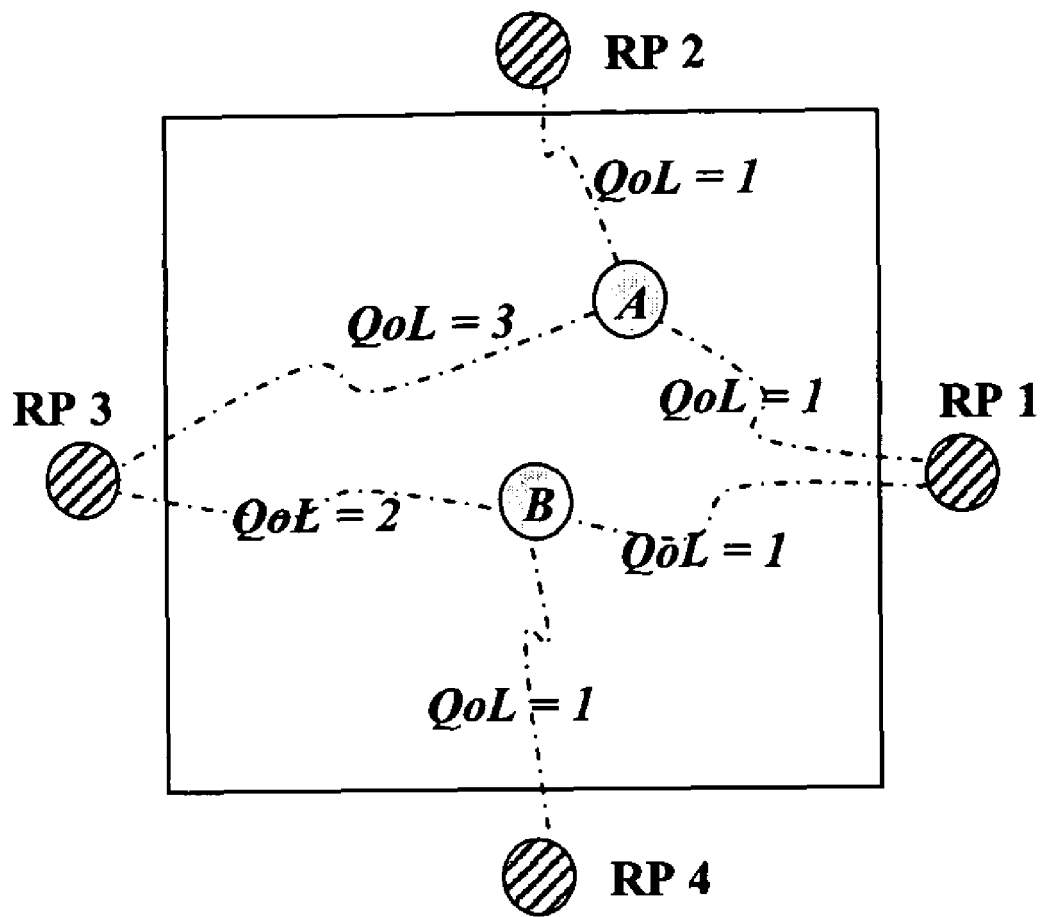
FIG. 1 shows an example for estimating a Quality of Link (QoL) according to the invention.

Further features and advantages of the present invention will be apparent from the following description of exemplary embodiments and from the claims.

DETAILED DESCRIPTION OF THE INVENTION

The invention is directed to systems and methods that efficiently configure an ad-hoc network, especially a self-configuring wireless sensor network operating in multipath-rich indoor areas.

Before describing the overall algorithm it is important to understand the different building blocks involved. The channel condition of the link between the nodes is very important in determining the quality of the position estimates. The Path-Loss Model (PLM) and Distance Measurement Error (DME) modeling efforts present detailed characterization of the channel. Indoor-indoor, outdoor-indoor and roof-indoor models provide a great insight into the behavior of the channel and the ranging errors involved. As such, these models are the very foundation for the iterative CLOQ algorithm. The Quality of Link (QoL) between nodes in an ad-hoc environment is a categorization derived from the PLM and the DME models. Table 1 below shows the translation of the received power of first path to the QoL index for a generic DME model. Typical threshold values for the 3 GHz DME model are $th_1=-90$ dB, $th_2=-105$ dB and $th_3=-115$ dB. Each category in turn would have a different mean and variance.

TABLE 1

QoL categorization for DME model

| QoL | Received First Power (db) |
|---|---|
| 1 | Power > $th_1$ |
| 2 | $th_2$ < Power < $th_1$ |
| 3 | $th_3$ < Power < $th_2$ |
| No Coverage | Power < $th_3$ |

As will be shown later, the received power between a node and an anchor will be used to generate the ranging errors using the mean and STD of the model. In addition, a QoL will be associated with each condition.

The QoE of a node is an index that describes the relative quality of a position estimate. Since ranging error in a triangulation is the most important factor in determining the accuracy of a position estimate, the QoE provide means of establishing relative bounds on the error. It is computed by adding the different QoL between a node and the 3 reference points. As a result, the QoE is computed as follows:

$$QoE = QoL_1 + QoL_2 + QoL_3 \quad (1)$$

$QoL_i$ is the quality of the channel between the node and the $i^{th}$ anchor involved in triangulation. For a 2-D case, three anchors i=1, 2, 3 are required for position determination. In other words, when a node sees three anchors each having a QoL=1, then its position estimate is much better than the position estimate of another node covered by three anchors having a QoL=3. The QoE provides a mapping of the channel condition for each link to the accuracy of the position estimate. In addition the QoE provides information on the channel conditions when a node is upgraded to an anchor. When a node computes its QoE and establishes itself as an anchor, the history of the channel condition when the transition occurred is mapped in the index for all other nodes to see.

FIG. 1 illustrates the physical meaning of QoE for a node. For example, node A is covered by RP 1, RP 2 and RP 3, whereas node B is covered by RP 1, RP 3 and RP 4. The QoE index is simply computed by adding the individual QoL's seen by the node. For example, node A's QoE is 1+1+3=5, while node B'sQ oE is +1+2=4. This means that node B has a higher estimated confidence than node A. It is then logical that node B becomes the new anchor.

In the event that two nodes have the same QoE, for example a QoE=6, which can be associated with different combinations, such as {2, 2, 2} and {1, 2, 3}, or a QoE=5, which can be associated with {1, 2, 2} and {1, 1, 3}, a further distinction can be made based on the individual QoL values in the respective links.

Simulations with different combinations have demonstrated that the different combinations can be divided into three distinct groups with markedly different error behavior. Table 2 shows these three different proposed QoE groups.

TABLE 2

Deriving the QoE index

| Group# | QoL | QoE |
|---|---|---|
| 1 | {1, 1, 1} | 3 |
|   | {1, 1, 2} | 4 |
|   | {1, 2, 2} | 5 |
|   | {2, 2, 2} | 6 |
| 2 | {1, 1, 3} | 11 |
|   | {1, 2, 3} | 12 |
|   | {2, 2, 3} | 13 |
| 3 | {1, 3, 3} | 19 |
|   | {2, 3, 3} | 20 |
|   | {3, 3, 3} | 27 |

Group 1 contains QoL's with only 1 or 2, i.e., with a superior signal strength according to Table 1, and therefore provides the best accuracy for the position estimate. Intuitively, a node with QoE=3 {1, 1, 1} is much better than a node with QoE=6 {2, 2, 2}.

Group 2 contains QoL's having exactly one link with the lowest acceptable signal strength of 3. Group 3 contains QoL's having at least two links with the lowest acceptable signal strength of 3. Whenever a link between a node and an anchor has a QoL=3, the accuracy of the position estimate deteriorates significantly. This degradation in accuracy is taken into account in the model by squaring any QoL value of 3 first before adding that QoL value in equation (1). Equation (1) can therefore be written as $$QoE = \sum_{i=1}^{3} (QoL_i)^n \quad (2)$$

with n=1 if $QoL_i=1$ or $QoL_i=2$; and
n=2 if $QoL_i=3$.

For example if the combination is {1, 2, 3}, then QoE=1+2+(3)²=12.

This approach ensures that no combination of QoL values in Table 1 has the same QoE index number, and in addition emphasizes the fact that a QoL of 3 introduces the most severe degradation to the position estimate.

In the exemplary network of nodes and anchors, any node covered by 3 or more anchors has the opportunity to become an anchor. If the number of anchors covering the node is exactly=3, then the node immediately computes its own QoE according to equation (2). However, if the node is covered by more than 3 anchors, then the node needs to select the "best" 3 anchors, i.e., those anchors having the best QoE. If a node is qualified to become an anchor, it is first selected as an "anchor-nominee" and then competes with other anchor-nominees for the privilege of upgrading to become an anchor in that specific iteration.

As can be seen that CLOQ is an iterative algorithm that elects additional anchors and thereby expands the coverage and refines the position estimates of other nodes in the expanded network. The iterative CLOQ algorithm has decision criteria that are based on two stages. The first stage involves selecting the best anchors that a node sees. The second stage is computing the QoE for that node.

Stage 1: Anchor Selection

Figure 2:
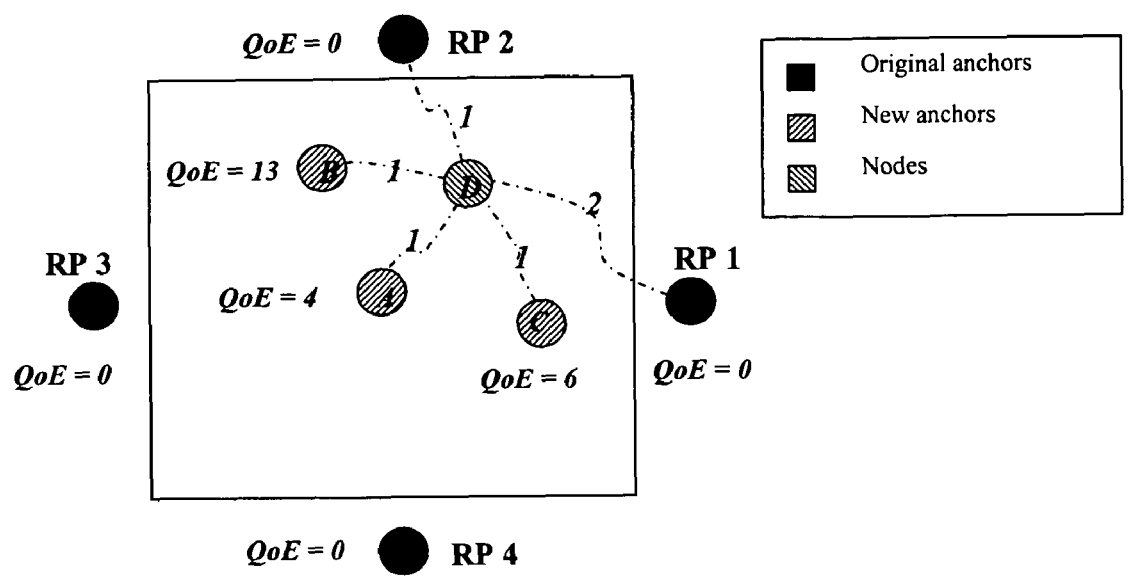
FIG. 2 shows an example for selecting an anchor according to the invention.

An exemplary anchor selection criterion is depicted in FIG. 2. At this stage, the node, such as exemplary node D, is listening to the various links to candidate anchors to search for a sufficiently strong QoL signal so it can triangulate its own position (for example, using a least-squares localization algorithm) and perhaps be eligible for upgrading itself to an anchor. If the node receives packets from more than 3 anchors then it ranks them according to the QoL between the node and that anchor, as discussed above with reference to Table 2. If QoL to several anchors is the same then the node has to sort them according to the QoE of the anchors, as determined with equation (2). Thereafter, the best three anchors are selected for computation of QoE and triangulation.

As shown in FIG. 2, node D listens to the various links (channels) and receives signals from 5 different anchors RP1, RP2, A, B, and C. The QoE of anchors A, B, and C was determined previously, as described above. The original RP's, RP1 and RP2, have a QoE=0, since their location is assumed to be known exactly. Node D now ranks the anchors RP1, RP2, A, B, and C according to the QoL. If the QoL's are similar, then they are ranked according to the QoE of the anchor. This approach emphasizes that the quality of the link between the node and the anchor is more important than the position error of an anchor. Table 3 shows the way node D will order the anchors. In this case, node D will choose anchors RP2, A and C for triangulation and QoE computation. RP1 is not chosen as an anchor due to the relatively poor QoL value compared with the other anchors. According to equation (3), D's QoE is =3, and node D now has the opportunity to compete with other anchor nominees and eventually become an anchor itself.

TABLE 3

Node D's anchor selection

| Anchor | QoL | QoE |
|---|---|---|
| RP2 | 1 | 0 |
| A | 1 | 4 |
| C | 1 | 6 |
| B | 1 | 13 |
| RP1 | 2 | 0 |

Stage 2: Anchor Nomination

Once a node is able to compute its QoE and triangulate its own position, then it is elevated to anchor-nominee. While in the anchor-nominee phase, node D will hear from other anchor-nominees and compare its own QoE to the QoE of the other anchor-nominees. If D has the best QoE, then it establishes itself as an anchor. Conversely, if another anchor-nominee has a better QoE value, then the anchor-nominee D return to node status and the other anchor-nominee becomes an anchor. Node D can then again attempt to compete for anchor status at another time. If several nominees have an identical best QoE, then they all become anchors.

Figure 3:
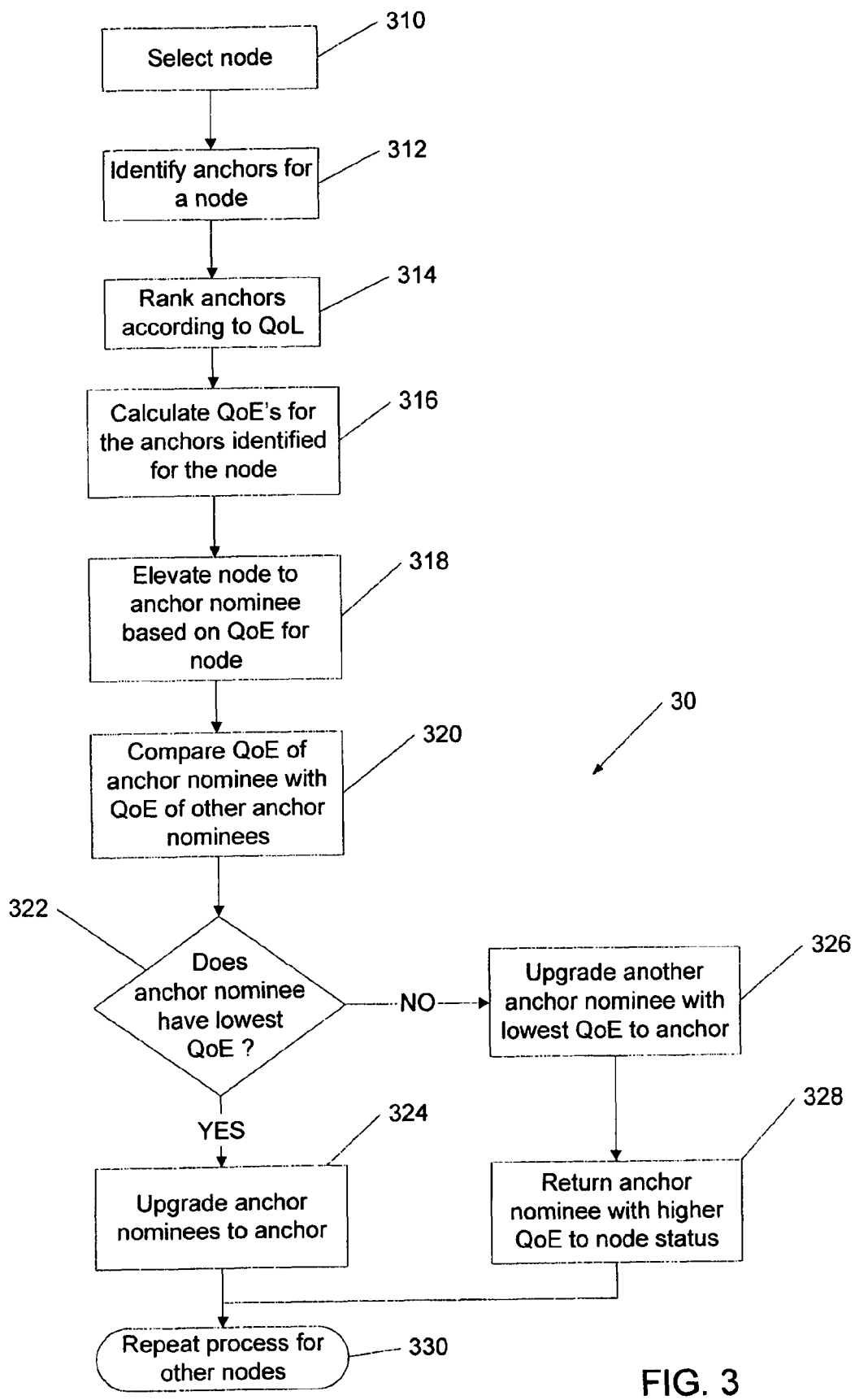
FIG. 3 is an exemplary process flow of the method for elevating nodes to anchors according to the invention.

An exemplary process 30 for elevating a node to an anchor-nominee and ultimately to an anchor is shown in form of a process flow diagram in FIG. 3. In a real-world example, anchor nodes with an established location (for example, by selection via GPS or as a prior anchor) may be distributed, for example, outside or inside a building. A node which is not an anchor, but which is capable to receive signals from and transmit signals to anchors, is already located or placed within a signal receive range of the anchors, at step 310. This node, such as node D in FIG. 2, receives signals from a plurality of identified anchors, such as anchors RP1, RP2, A, B, and C, at step 312. The node then ranks the anchors according to the strength of the signal link, at step 314, and calculated the corresponding QoE (see Table 3) for the various links, at step 316. The node is then elevated to anchor-nominee, provided it has an acceptable QoE and is able to receive an acceptable timing signal from the anchors to determine its location, at step 318.

The anchor-nominee node then communicates with other nodes which also determine their respective QoL and QoE according to steps 310 to 318 and may also be elevated to anchor-nominee. The communicating anchor-nominees in the network will then compare their respective QoE values with one another, at step 320. The process 30 then determines, at step 322, if the first anchor-nominee has the lowest QoE value, in which case that anchor-nominee is upgraded to anchor status, at step 324. Process 30 then goes to step 330, and optionally repeats the process for another node, starting again at step 310. If at step 322 an anchor-nominee with a lower QoE is found, then the other anchor-nominee with the lower QoE is upgraded to anchor status, at step 326, and the previously identified anchor-nominee with the higher QoE is returned to node status, at step 328. Process 30 then goes to step 330, and optionally repeats the process for another node, starting again at step 310.

It is evident that with process 30, an area can be successively populated with nodes which then advance to anchor-nominee and anchor status. This creates a finer mesh of reference points for locating the position of nodes, as will be shown in the following simulation.

3. Simulation Results

Figure 4:
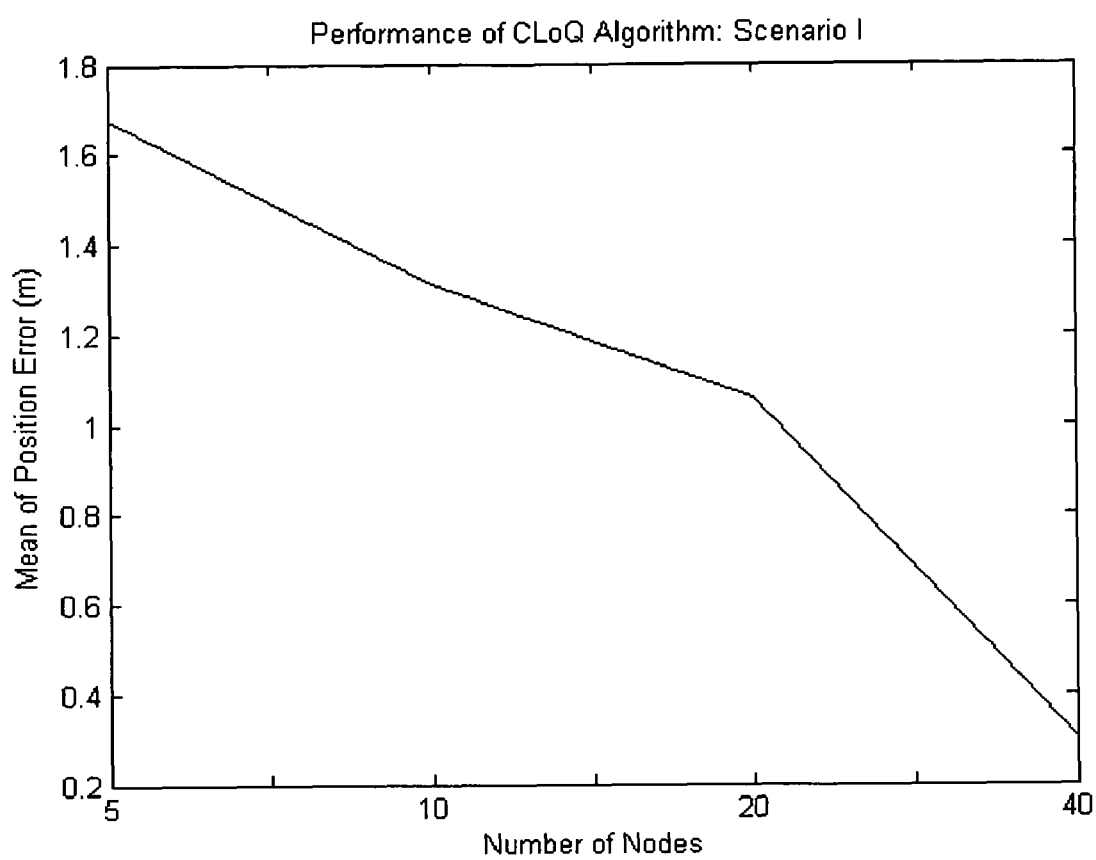
FIG. 4 shows simulated results for the mean position error as a function of anchor nodes in the system according to the invention.

FIG. 4 shows the mean of simulated position errors as a function of the number of anchor nodes in a typical office area. Each node is assumed to have a range of 15-20 m. Notice the significant improvement provided by the increased numbers of anchor nodes. The average error with 5 nodes in a large area, for example 50 m by 25 m, is around 1.6 m, or 10% of the 15-20 m range of each node, which is already an improvement over other results reported with ad-hoc positioning.

The average position error for 40 anchor nodes is around 0.3 m which is a dramatic improvement in position accuracy and demonstrates the ability of the disclosed method to accurately estimate the position of nodes.

Figure 5:
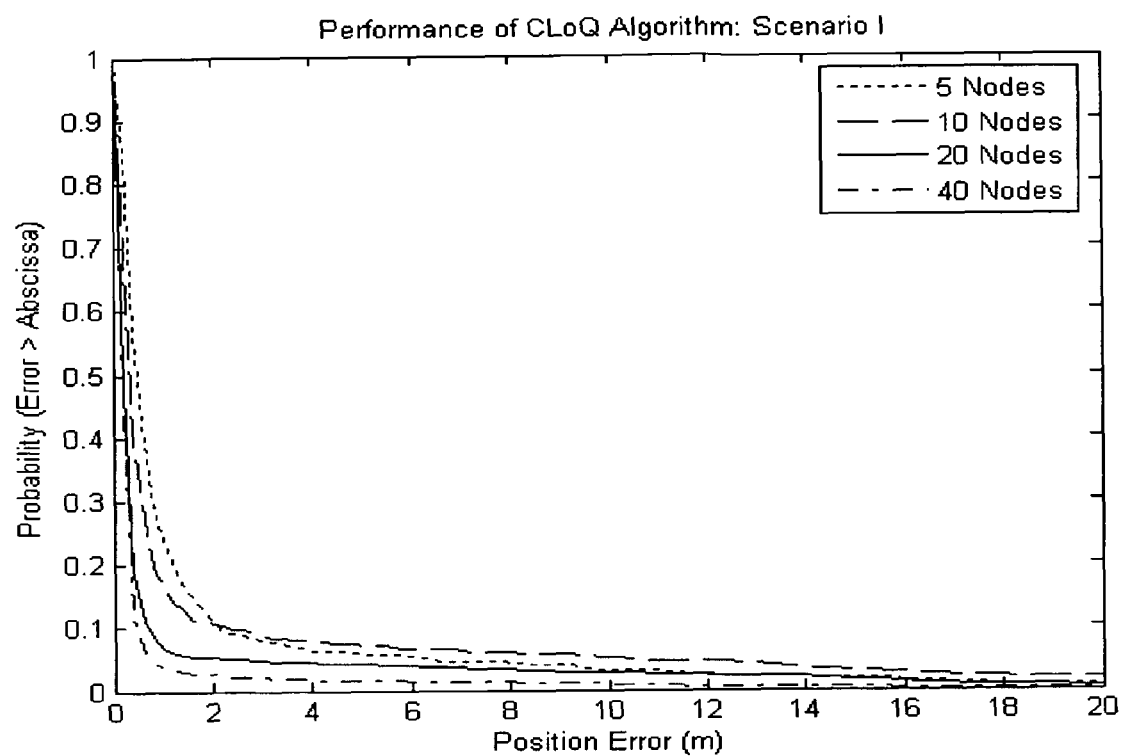
FIG. 5 shows simulated results for the cumulative position error for different numbers of anchor nodes.

FIG. 5 shows the Complementary Cumulative Distribution Function (CCDF) which provides another measure for the improvements achieved by increasing the number of anchors, in addition to the improved mean position error. The CCDF is shown for 4 cases with a total of 5, 10, 20, and 40 anchor nodes, respectively. It is evident that 40 anchor nodes perform significantly better than a lesser number of anchor nodes. Table 4 lists the 80% and 90% cumulative probability values of the CCDF. The 90% cumulative probability value indicates that for 90% of the examples the error is below the listed value. For example, 90% of the positions detected with 5 anchor nodes have a position error below 2.15 m, whereas 90% of the positions detected with 40 anchor nodes have a position error below 0.46 m. The CCDF parameter is in fact more powerful than the average position error, because it describes the occurrence probability of position errors. Again this information clearly emphasizes a desirable feature of the CLOQ algorithm, namely the ease with which the number of nodes can be increased to improve the overall accuracy of the position estimates.

TABLE 4

CCDF values of position errors (m)

| # of Nodes | 80% (m) | 90% (m) |
|---|---|---|
| 5 | 1.18 | 2.15 |
| 10 | 0.79 | 1.9 |

TABLE 4-continued

CCDF values of position errors (m)

| # of Nodes | 80% (m) | 90% (m) |
|---|---|---|
| 20 | 0.39 | 0.7 |
| 40 | 0.35 | 0.46 |

The simulation results demonstrate that the CLOQ algorithm provides a practical approach for large-scale ad-hoc location estimation. Other algorithms such as Sav01 and Sav02 tend to ignore the channel propagation characteristic. In the present approach, the problem of ad-hoc positioning is simplified by taking into account the channel propagation characteristic. The described algorithm successfully provides an improved position accuracy while outperforming other more complicated algorithms. Once the channel propagation condition (QoL) is modeled correctly, the simple, yet practical CLOQ algorithm provides position accuracy that has been unattainable with the other algorithms.

While the invention has been disclosed in connection with the preferred embodiments shown and described in detail, various modifications and improvements thereon will become readily apparent to those skilled in the art. For example, although the exemplary self-configuring wireless sensor network has been described for a two-dimensional system requiring three selected anchors having an adequate QoL for determining the QoE for a node, the present system and method of the invention can be extended to position determination in three dimensions. In this case, four anchors must be selected by a node, so that the QoE value in equations (1) and (2) is computed from i=1 to 4. The groups listed in Table 2 are then described by 4-tuples, and another Group 4 may be added which allows 3 of the 4 links having a QoL value of 3.

The invention can be utilized in a number of public safety, emergency, and military operations, including disaster recover, firefighting, and urban warfare. Systems built according to the invention are particularly useful when a mobile user, such as a firefighter, emergency medical technician, or soldier is operating in an unknown indoor environment, such as a building. Consider the following example:

Assume that the GPS-equipped anchor nodes are transponders placed around the perimeter of the building. These can be nodes placed on the ground or mounted on trucks. For higher level localization scenarios (i.e., for higher floors of the building), transponders located on the ladder of a fire truck, for example, could help extend coverage. Each mobile operator carries a sensor node while traveling inside the building. Additional stationary sensor nodes can also be placed inside the building as the operators start entering the building. These stationary nodes will provide extended access for the network. While the mobile operators move inside the building and the stationary nodes are placed, locations will be estimated using the techniques described above and only those with good channel coverage will transform into anchor nodes and start aiding other nodes to localize accurately. The number of stationary nodes can be adjusted to support required accuracy for the application. Therefore, the nodes are preferably small and inexpensive so that a large number of nodes can be scattered inside the building."

Figure 6:
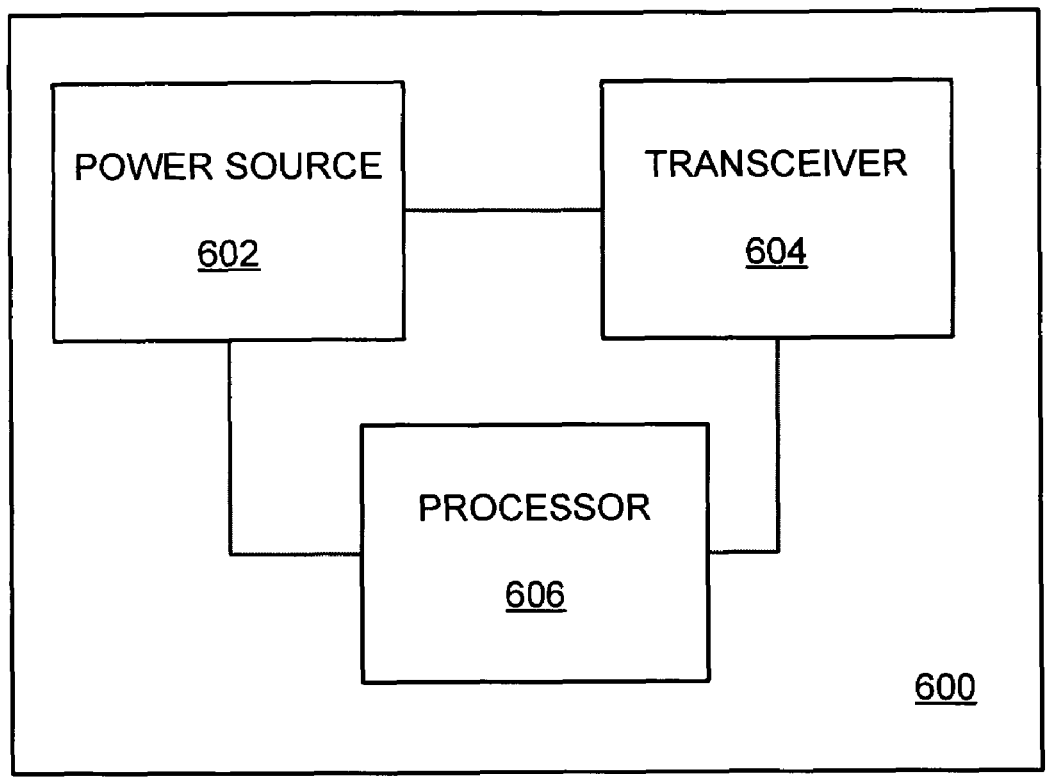
FIG. 6 shows an illustrative node architecture.

FIG. 6 is a block diagram of an illustrative node architecture. Each node 600 includes a power source 602, a transceiver 604, and a processor 606. The power source 602 can be a battery, solar cell, or other power source known to those of skill in the art. Preferably, the power source 602 is relatively small and lightweight to promote the portability of the node 600. The transceiver 604, in one implementation is an ultra-wideband transceiver. Alternatively, the node 600 can include a distinct transceiver and receiver. The processor 606 can be an application specific integrated circuit, a digital signal processor, or general purpose processor configured to carry out a localization algorithm, such as a least squares localization algorithm, as well as the CLOQ algorithm described herein. The processor 606 receives and analyzes signals received by the node 600 via the transceiver 604, and likewise controls the signals the node outputs 600.

One skilled in the art will therefore appreciate that the present invention can be practiced by other than the described embodiments, which are presented for purposes of illustration and not of limitation, and the present invention is limited only by the claims which follow.

The invention claimed is:

1. A method for determining a position of a node in a network, comprising:
    providing a plurality of anchors having a known position, each anchor transmitting a position signal indicating the position of the respective anchor;
    positioning at least one non-anchor node within signal range of the anchors;
    receiving, at the at least one positioned non-anchor node, at least one of the position signals from the anchors;
    determining from a signal strength (QoL) of the received signals a quality of position estimate (QoE) for the at least one non-anchor node;
    comparing the determined QoE for the at least one non-anchor node with QoE values for others of the at least one non-anchor node; and
    upgrading one of the at least one non-anchor nodes to serve as an additional anchor based on the comparison of the QoE values for the non-anchor nodes, wherein in response to the upgrading, the upgraded node begins transmitting a position signal indicating its position.

2. The method of claim 1, further comprising determining the position of the additional anchor relative to the anchors having a known position by a propagation time measurement of the signals from the anchors having the known position.

3. The method of claim 1, wherein each anchor transmits its QoE and wherein determining the QoE for the at least one non-anchor node comprises:
    determining from the plurality of anchors a group of anchors each having an identical QoL; and
    selecting from the determined group of anchors each having an identical QoL a subset of anchors with the lowest QoE.

4. The method of claim 1, wherein the QoE for the at least one non-anchor node is determined by adding QoL values for the anchors, wherein a QoL value for the weakest permissible link is squared.

5. The method of claim 1, wherein 3 anchors having known positions are required for determining a position of a node in a plane, and 4 anchors having known positions are required for determining a position of a node in 3-dimensional space.

6. A method for configuring a network for determining a position of a node, comprising
    a. providing a plurality of anchors having a known position, each anchor transmitting a position signal indicating the position of the respective anchor;
    b. positioning at least one non-anchor node within signal range of the anchors;
    c. receiving, at the at least one positioned non-anchor node, at least one of the position signals from the anchors;

d. determining from a signal strength (QoL) of the received signals a quality of position estimate (QoE) for the at least one non-anchor node;

e. comparing the determined QoE for the at least one non-anchor node with the QoE for others of the at least one non-anchor node;

f. upgrading one of the at least one non-anchor nodes to serve as an additional anchor based on the comparison of the QoE values for the non-anchor nodes, wherein in response to the upgrading, the upgraded node starts transmitting a position signal indicating its position; and g. repeating steps (c) through (f) for another non-anchor node until all non-anchor nodes having a computed QoE and capable of receiving a position signal from the plurality of anchors or from the additional anchors have been upgraded to anchors.

7. An ad-hoc network of wireless sensors for position determination, comprising:

a plurality of anchors having a known position, each anchor transmitting a position signal indicating the position of the respective anchor;

at least one non-anchor node positioned within signal range of the anchors and configured to receive quality of position estimate (QoE) values for others of the at least one non-anchor node;

wherein the at least one node is configured to determine a QoE based on a signal strength (QoL) of the signals received from the anchors and compare its QoE with the QoE for the others of the at least one non-anchor node; and wherein one of the at least one non-anchor nodes is upgraded to serve as an additional anchor based on the comparison of the QoE values for the non-anchor nodes, wherein in response to the upgrading, the upgraded node begins transmitting a position signal indicating its position.

* * * * *